3,337,236
VARIABLE LOAD TORSION BAR SUSPENSION SYSTEM

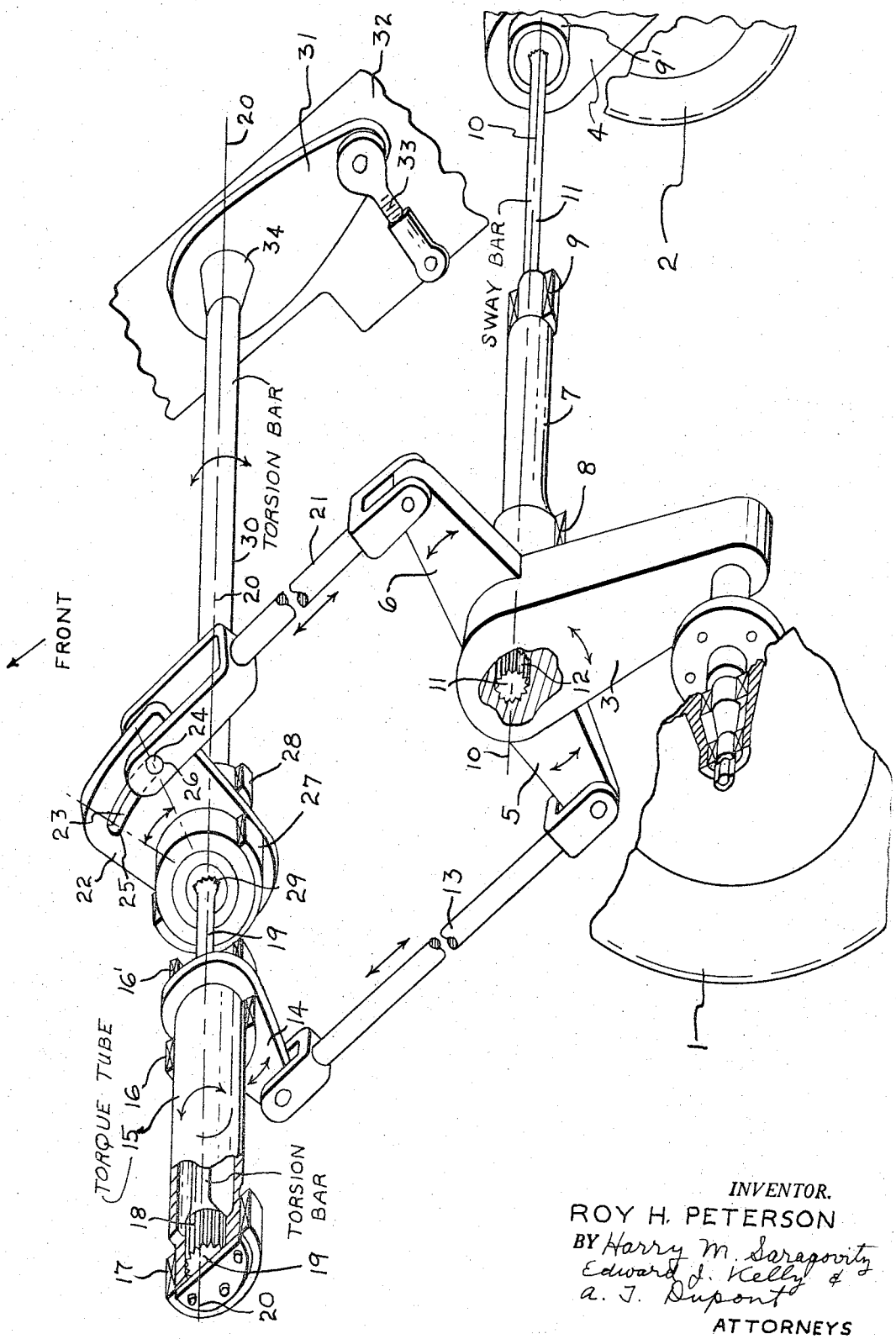

Roy H. Peterson, Alexandria, Va., assignor to the United States of America as represented by the Secretary of the Army
Filed Sept. 13, 1965, Ser. No. 487,096
6 Claims. (Cl. 280—124)

The invention described herein may be manufactured and used by or for the Government for governmental purposes, without the payment to me of any royalty thereon.

For certain uses torsion bar suspension systems have certain well-known advantages over leaf springs, coil springs, air suspension systems and others. The present invention is directed toward a simple torsion bar suspension system having sway-bar lateral stabilization plus low-load torsion bar suspension for smooth riding characteristics, and having overload torsion bar apparatus which comes into use automatically when the need for it arises.

The single figure is a perspective view illustrating an example of the invention.

Wheels 1 and 2, which may be the wheels of a trailer, the front wheels of a four or six wheel vehicle, or other, are connected respectively to a first lever arm 3 and a second lever arm 4. A third arm 5 is rigidly connected with arm 3. These arms are pivotable, together with housing member 7 mounted in bearings 8, 9, about axis 10—10. Axis 10—10 is the centerline of swaybar (torsion bar) 11. The arm assembly 3, 6 is connected to shaft 11 through spline 12. Bearings 8, 9, 9' are connected to the frame of the vehicle.

Arm 5 is connected through linkage 13 to a fourth arm 14. Arm 14 is rigidly connected to torque tube 15 which is mounted in bearings 16, 16', 17. Splined connection 18 connects torque tube 15 to torsion bar 19 which may pivot or twist about axis 20—20.

A fifth arm 22 is connected through linkage 21 to a sixth arm 6. Arm 22 is provided with a slot 23 through which pin 24 projects to provide a lost-motion connection between arm 22 and linkage 21. The ends of slot 23 are designated 25 and 26.

Arm 22 is pivotally mounted in bearings 27, 28. Torsion bar 19 is locked for pivotal movement with arm 22 through splined connection 29. One end of torsion bar 30 is also locked for pivotable movement with arm 22. Torsion bar 30 is larger, or otherwise more resistant to twisting, than torsion bar 19. Torsion bar 30 is supported at its outer end by bearing 34 and is rigidly connected to frame 32 by adjustable linkage 33. Torsion bars 30, 19 are pivotably connected to the vehicle frame through bearings 16, 16', 17, 27, 28 and 34.

Operation

When the vehicle turns a curve outer wheel 1 is pressed hard against the pavement thereby raising arm 3 relative to bearing 8 and the vehicle frame. The reaction through swaybar (torsion bar) 11 lowers the opposite side of the vehicle frame adjacent to wheel 2 to reduce sway of the vehicle in a manner well understood in the art.

The wheel suspension system affects the entire vehicle frame-wheel relationship as follows. The vehicle frame pushes down when the vehicle is making a right turn with wheel 1 on the outside. This raises lever arm 3 relative to the frame and arm 5 is moved forward pulling on linkage 13 and arm 14. (Note: for convenience of description, the front of the vehicle is considered to be toward the top of the drawing.) As arm 14 is pulled rearwardly it twists torsion bars 19, 30. Torsion bar 19, being of lower twisting resistance than bar 30, will twist to a greater degree and bar 30 will twist to a lesser degree. Linkage 33 prevents movement of the outer end of arm 31 so that the reaction lowers torsion bars 30, 19 and the vehicle frame attached thereto at bearings 16, 16', 17, 27, 28, 34. Thus, the tendency for the vehicle frame to sway and tip over is largely counteracted by reaction forces throughout the system which lower the entire frame nearer to the pavement in proportion to the tendency of the frame to tip over.

When the vehicle is unloaded the frame will ride high with wheel supporting arm 3 pivoted down, arm 6 and linkage 21 in a rearward position and with pin 24 near the rear end 26 of slot 23 in arm 22. The body is lightly sprung by proper tension on torsion bar 19. When wheel 1 (or wheel 2) engages ordinary bumps, arm 3 pivots upwardly and arm 5, linkage 13 and arm 14 move rearwardly against increasing resistance in torsion bar 19, with torsion bar 30 twisting to a lower degree. Simultaneously arm 6, linkage 21 and pivot pin 24 move forwardly. If the bump is not excessive pin 24 does not reach the front end 25 of slot 23 and the soft springing of torsion bar 19, plus slight twisting of bar 30, yields a smooth ride. If the bump is excessive pin 24 engages the front end 25 of slot 23. From this point on no further twisting of bar 19 occurs because arms 14 and 22 continue pivoting by equal angular degrees. Further movement of the parts will twist the large, high capacity, torsion bar 30.

When the vehicle is loaded to normal capacity the frame rides lower with arm 3 pivoted up slightly and arm 5, linkage 13 and arm 14 moved rearward against resistance of torsion bar 19. Arm 6, linkage 21 and pin 24 are moved forward to a point where pin 24 is adjacent to the front end 25 of slot 23. If a wheel (1 or 2) strikes a bump, arm 6, linkage 21 and pivot pin 24 move further forward thus moving arm 22 against the high resistance of large capacity torsion bar 30.

If the vehicle is overloaded arm 6, linkage 21 and pin 24 at the forward end 25 of slot 23 will move arm 22 forwardly against the (overload) resistance of torsion bar 30.

Arm 31 is adjusted, by linkage 33, to pre-stress the torsion bars for the load capacity desired. This setting may be changed for a different load capacity, or may be changed in the event of aging and weakening of the torsion bars.

I claim:
1. Variable load torsion bar suspension apparatus comprising a sway bar, first and second arms attached adjacent to opposite ends of said sway bar, means pivotably attaching said sway bar and arms to a vehicle frame, a first wheel and a second wheel attached to said first and second arms respectively, a third arm rigidly attached to said first arm and pivotable therewith, torsion bar means, means connecting one end of said torsion bar means non-rotatably to said vehicle frame, a fourth arm fixedly connected adjacent to the opposite end of said torsion bar means, and connecting means between said third arm and said fourth arm.

2. Apparatus as in claim 1 wherein said torsion bar means comprises torsion bar elements of different torsion-resistances whereby a first torsion element will twist to a relatively high degree and a second torsion element will twist only slightly when subjected to a given torsion load.

3. Apparatus as in claim 2 and a fifth arm rigidly connected to said first torsion element and said second torsion element, a sixth arm rigidly connected to said first and third arms and pivotable therewith, and lost-motion means connecting said fifth arm and said sixth arm.

4. Apparatus as in claim 3 wherein said lost-motion means comprises a slot in said fifth arm and a pin movable between ends of said slot and connected by a link, to said sixth arm.

5. Apparatus as in claim 1 wherein said means connecting said torsion bar means nonrotatably to said vehicle frame comprises adjustable means to preset, or later adjust, the angular setting of said torsion bar means relative to said frame.

6. Apparatus as in claim 1 and a torque tube connected to said fourth arm and said torsion bar means to transmit twisting forces between said fourth arm and said torsion bar means.

References Cited

UNITED STATES PATENTS 2,855,212  10/1958  Houser.
3,158,365  11/1964  Peras.

FOREIGN PATENTS 995,581  8/1951  France.

BENJAMIN HERSH, *Primary Examiner.*

PHILIP GOODMAN, *Examiner.*